United States Patent
Wang et al.

(10) Patent No.: US 11,546,607 B2
(45) Date of Patent: Jan. 3, 2023

(54) METHOD FOR OPTIMIZING STRUCTURE SIMILARITY INDEX IN VIDEO CODING

(71) Applicant: ALIBABA GROUP HOLDING LIMITED, Grand Cayman (KY)

(72) Inventors: Zhao Wang, Beijing (CN); Yan Ye, San Diego, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/232,852

(22) Filed: Apr. 16, 2021

(65) Prior Publication Data

US 2021/0329256 A1 Oct. 21, 2021

Related U.S. Application Data

(60) Provisional application No. 63/012,146, filed on Apr. 18, 2020.

(51) Int. Cl.

| | |
|---|---|
| *H04N 19/147* | (2014.01) |
| *H04N 19/85* | (2014.01) |
| *H04N 19/119* | (2014.01) |
| *H04N 19/176* | (2014.01) |
| *H04N 19/172* | (2014.01) |

(52) U.S. Cl.
CPC ......... *H04N 19/147* (2014.11); *H04N 19/119* (2014.11); *H04N 19/172* (2014.11); *H04N 19/176* (2014.11); *H04N 19/85* (2014.11)

(58) Field of Classification Search
CPC .......................... H04N 19/147; H04N 19/119
See application file for complete search history.

(56) References Cited

U.S. PATENT DOCUMENTS

| | | | |
|---|---|---|---|
| 2010/0150459 A1* | 6/2010 | Coulombe | H04N 19/164 |
| | | | 382/232 |
| 2012/0328002 A1 | 12/2012 | Vafin et al. | |
| 2013/0301725 A1 | 11/2013 | Wang et al. | |
| 2014/0119432 A1 | 5/2014 | Wang | |
| 2014/0307785 A1* | 10/2014 | Topiwala | H04N 19/156 |
| | | | 375/240.07 |
| 2014/0376645 A1 | 12/2014 | Kumar et al. | |
| 2016/0021376 A1 | 1/2016 | Andreopoulos et al. | |
| 2021/0104076 A1* | 4/2021 | Zare | H04N 19/103 |

OTHER PUBLICATIONS

"JVET software repository," https://https://jvet.hhi.fraunhofer.de/svn/svn HMJEMSoftware/.: https://jvet.hhi.fraunhofer.de/svn_HMJEMSoftware/branches/I-IM-13.0-QTBT/.

(Continued)

*Primary Examiner* — Jerry T Jean Baptiste
(74) *Attorney, Agent, or Firm* — Finnegan, Henderson, Farabow, Garrett & Dunner, LLP

(57) ABSTRACT

The present disclosure provides a computer-implemented method for encoding video. The method includes: generating training data based on one or more video sequences, the training data including a structure similarity index comprising at least one of structure similarity index (SSIM) or multi-scale-structural similarity index (MS-SSIM); training a rate-distortion optimization (RDO) model using the training data; processing the one or more video sequences using the rate-distortion optimization model.

21 Claims, 15 Drawing Sheets

(56) References Cited

OTHER PUBLICATIONS

Bossen et al., "Hevc HM12 Reference Software," JCTVC-N1010, 14$^{th}$ Meeting: Vienna, AT, Jul. 15-Aug. 2, 2013 (6 pages).
Bross et al., "Versatile Video Coding (Draft 7)," JVET-P2001-vE, 16$^{th}$ Meeting: Geneva, CH, Oct. 1-11, 2019, 488 pages.
Ding et al., "Rate Control of MPEG Video Coding and Recording by Rate-Quantization Modeling," IEEE Transactions on Circuits and Systems for Video Technology, vol. 6, No. 1, pp. 12-20, Feb. 1996.
Hang et al., "Source Model for Transform Video Coder and Its Application—Part I: Fundamental Theory," IEEE Transactions on Circuits and Systems for Video Technology, vol. 7, No. 2, pp. 287-298, Apr. 1997.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Li et al., "Laplace Distribution Based Lagrangian Rate Distortion Optimization for Hybrid Video Coding," IEEE Transactions on Circuits and Systems for Video Technology, vol. 19, No. 2, pp. 193-205, Feb. 2009.
Sullivan, et al., "Rate-Distortion Optimization for Video Compression," IEEE Signal Processing Magazine, pp. 74-90, Nov. 1998.
Wang et al., "Multi-Scale Structural Similarity for Image Quality Assessment," The Thirty-Seventh Asilomar Conference on Signals, Systems & Computers, vol. 2, pp. 1398-1402, 2003.
Wang et al., "Image Quality Assessment: From Error to Visibility to Structural Similarity," IEEE Transactions on Image Processing, vol. 13, No. 4, pp. 600-612, Apr. 2004.
Workshop and Challenge on Learned Image Compression, CVPR2020. https://www.compression.cc/.
Zhang et al., "Chroma Coding Efficiency Improvement with Context Adaptive Lagrange Multiplier (CALM)," IEEE Int. Symp. Circuits Systems (ISCAS), pp. 293-296, May 2007.
PCT International Search Report and Written Opinion dated Jul. 19, 2021, issued in corresponding International Application No. PCT/US2021/027697 (8 pgs.).
Sampat et al., "Complex Wavelet Structural Similarity: A New Image Similarity Index," IEEE Transactions on Image Processing, vol. 18, No. 11, Nov. 2009, pp. 2385-2401.

* cited by examiner

500

502 — Generating training data based on one or more video sequences, the training data including a structure similarity index comprising at least one of structure similarity index (SSIM) or multi-scale-structural similarity index (MS-SSIM)

504 — Training a rate-distortion optimization (RDO) model using the training data 506 — Processing the one or more video sequences using the rate-distortion optimization model

FIG. 5

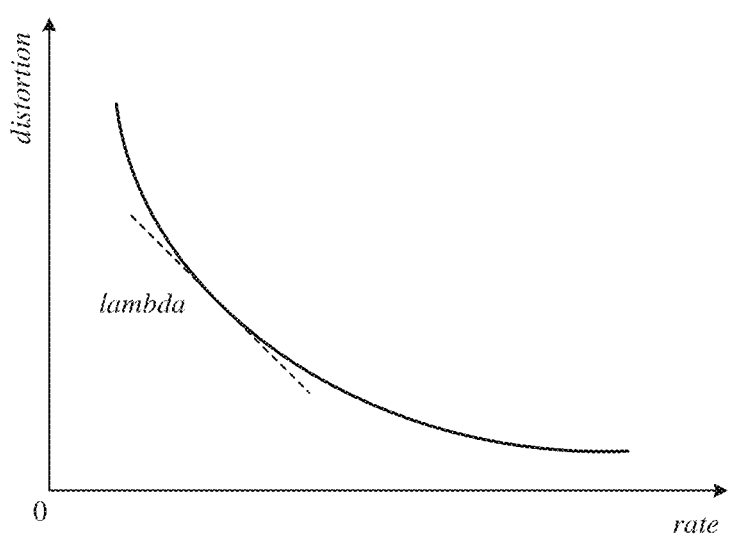
FIG. 6: Exemplary rate-distortion optimization

700

702 — Determining the average bitrate using a sum of the coding bitrates of the one or more video sequences and a number of the one or more video sequences

704 — Determining the average structure similarity index using a sum of the structure similarity indices over frames of the one or more video sequences and the number of the one or more video sequences

FIG. 7

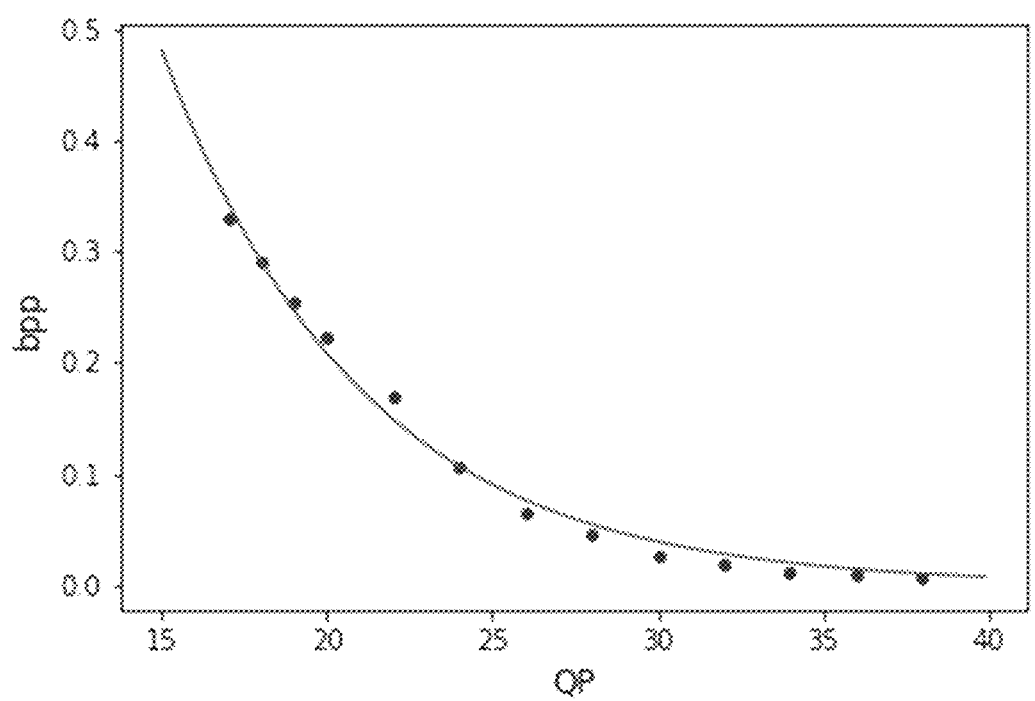
FIG. 9A: Exemplary relationship of R-QP on the frame level data

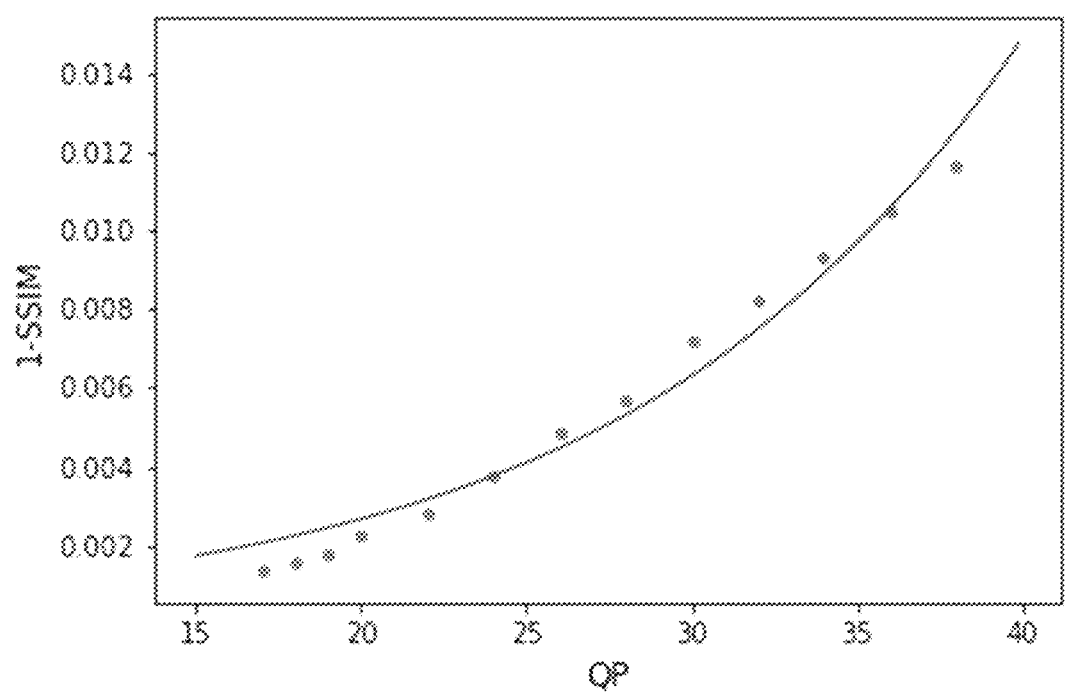
FIG. 9B: Exemplary relationship of D-QP on the frame level data

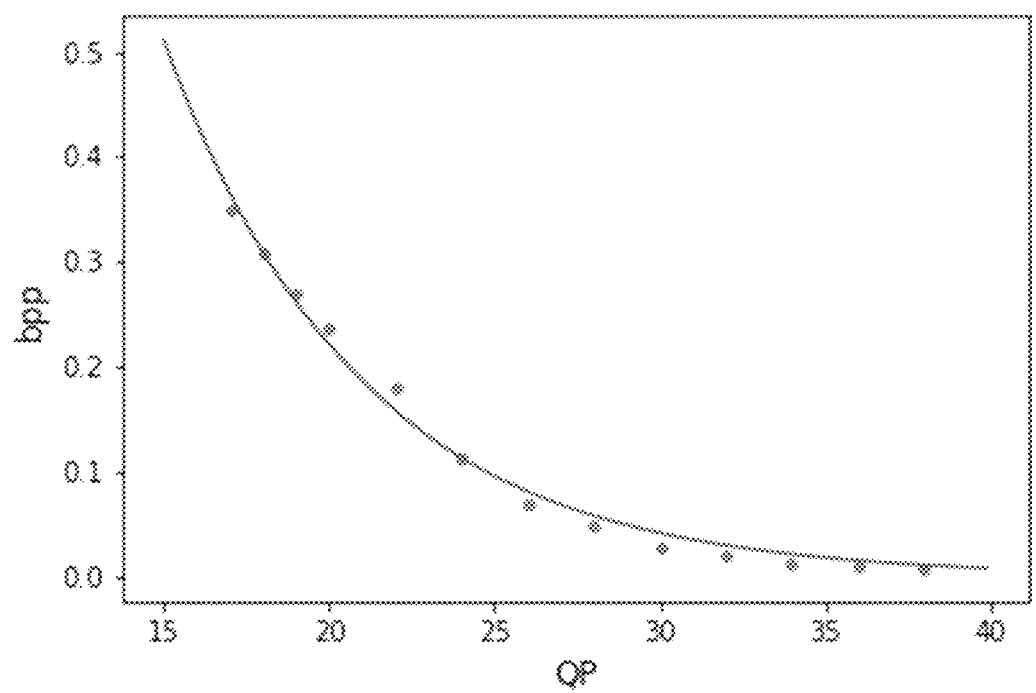
FIG. 10A: Exemplary relationship of R-QP on the block level data

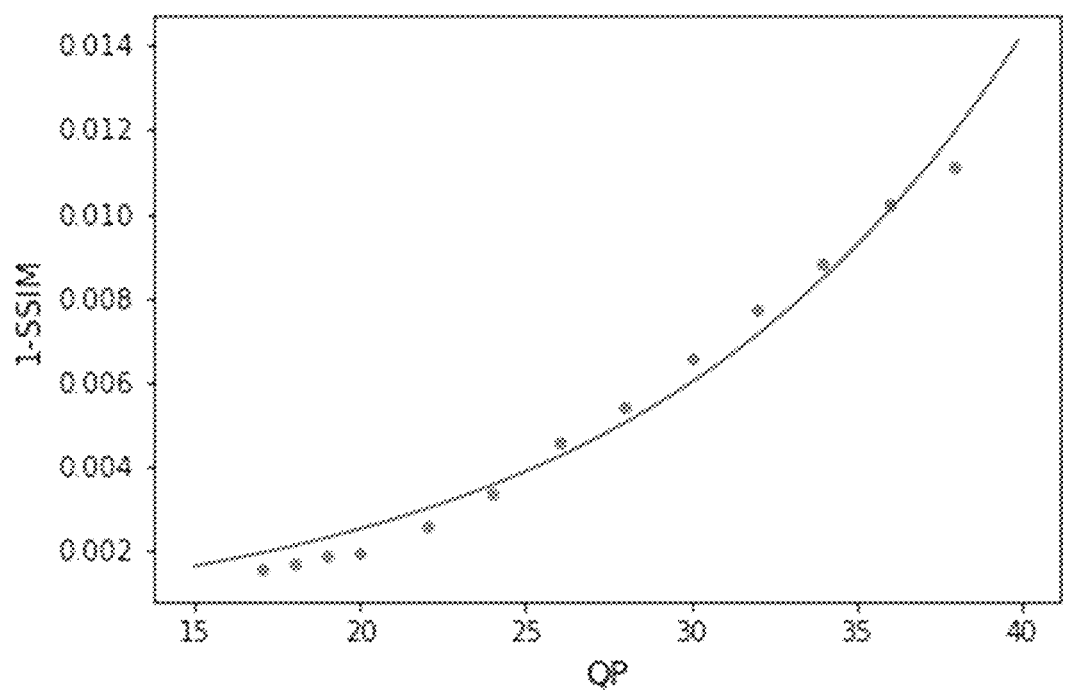
FIG. 10B: Exemplary relationship of D-QP on the block level data

METHOD FOR OPTIMIZING STRUCTURE SIMILARITY INDEX IN VIDEO CODING

CROSS-REFERENCE TO RELATED APPLICATIONS

The disclosure claims the benefits of priority to U.S. Provisional Application No. 63/012,146, filed on Apr. 18, 2020, which is incorporated herein by reference in its entirety.

TECHNICAL FIELD

The present disclosure generally relates to video processing, and more particularly, to methods and apparatuses for optimizing structure similarity index in video coding.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for optimizing structure similarity index in video coding. In some embodiments, the method includes: generating training data based on one or more video sequences, the training data including a structure similarity index comprising at least one of structure similarity index (SSIM) or multi-scale-structural similarity index (MS-SSIM); training a rate-distortion optimization (RDO) model using the training data; processing the one or more video sequences using the rate-distortion optimization model.

Embodiments of the present disclosure provide an apparatus for optimizing structure similarity index in video coding. In some embodiments, the apparatus comprising: a memory configured to store instructions; and one or more processors communicatively coupled to the memory and configured to execute the instructions to cause the apparatus to perform: generating training data based on one or more video sequences, the training data including a structure similarity index comprising at least one of structure similarity index (SSIM) or multi-scale-structural similarity index (MS-SSIM); training a rate-distortion optimization (RDO) model using the training data; processing the one or more video sequences using the rate-distortion optimization model.

Embodiments of the present disclosure provide a non-transitory computer-readable storage medium that stores a set of instructions that is executable by one or more processors of an apparatus to cause the apparatus to initiate a method for performing video data processing. In some embodiments, the method includes: generating training data based on one or more video sequences, the training data including a structure similarity index comprising at least one of structure similarity index (SSIM) or multi-scale-structural similarity index (MS-S SIM); training a rate-distortion optimization (RDO) model using the training data; processing the one or more video sequences using the rate-distortion optimization model.

BRIEF DESCRIPTION OF THE DRAWINGS

Embodiments and various aspects of the present disclosure are illustrated in the following detailed description and the accompanying figures. Various features shown in the figures are not drawn to scale.

FIG. 5 shows a flow chart of a method for optimizing structure similarity index in video coding, according to some embodiments of the present disclosure.

FIG. 6 illustrates an exemplary rate-distortion optimization process, according to some embodiments of the present disclosure.

FIG. 7 shows a flow chart of a method for determining the average bitrate and the average structure similarity index, according to some embodiments of the present disclosure.

FIG. 9A and FIG. 9B illustrate exemplary relationships of R-QP and D-QP on the frame level data respectively, according to some embodiments of the present disclosure.

FIG. 10A and FIG. 10B illustrate exemplary relationships of R-QP and D-QP on the block level data respectively, according to some embodiments of the present disclosure.

DETAILED DESCRIPTION

Figure 1:
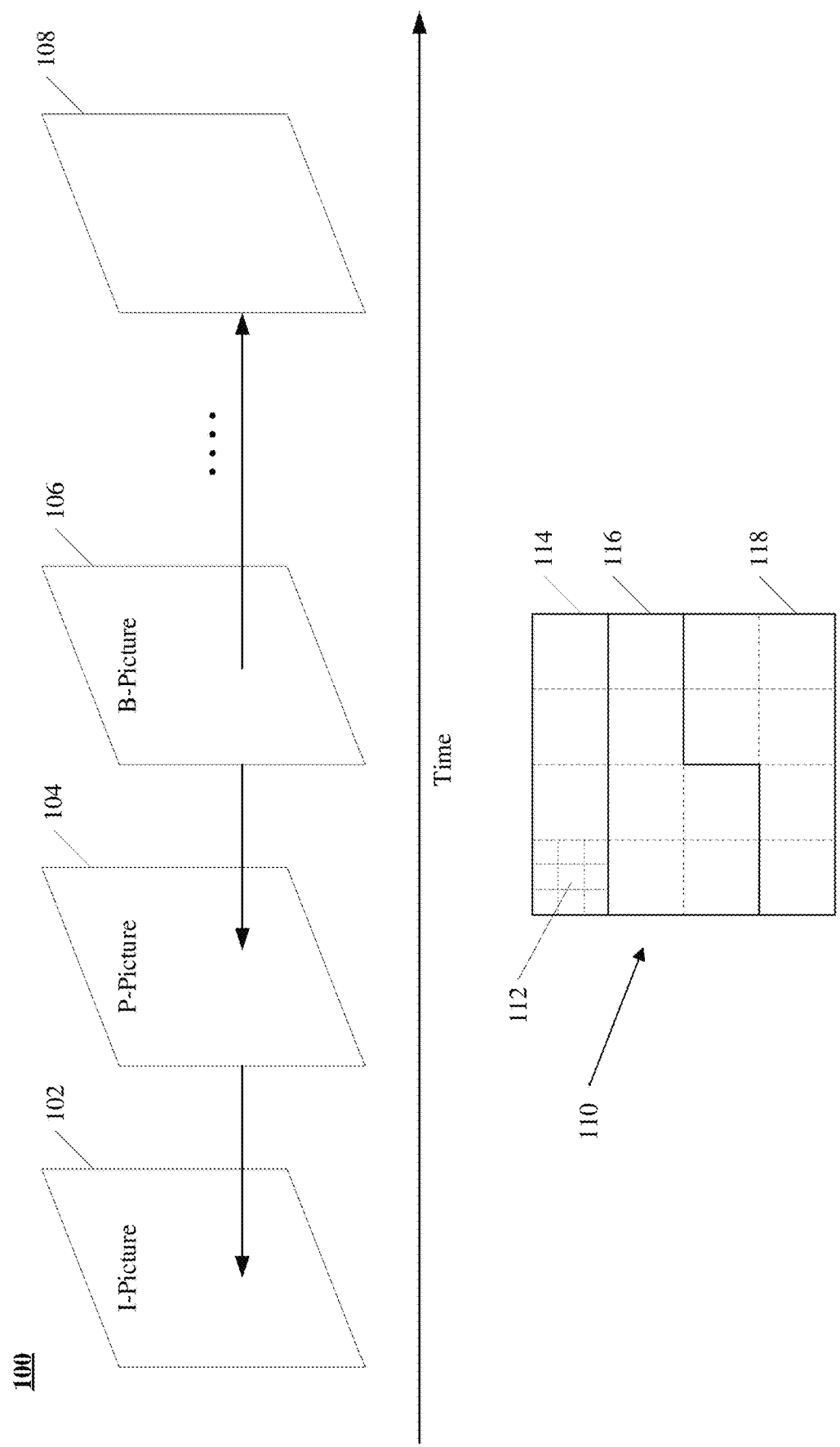
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (WET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the WET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
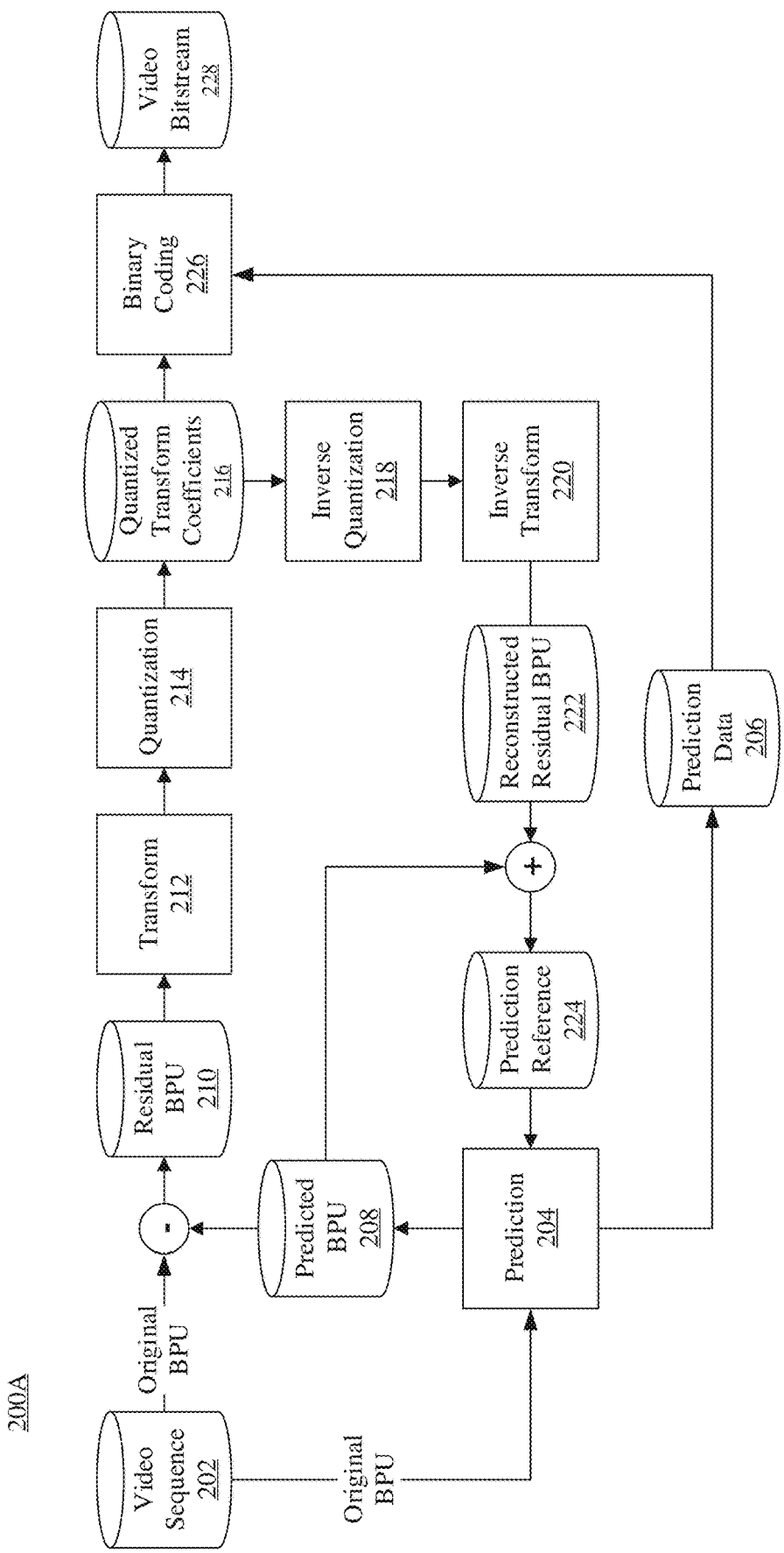
FIG. 2A is a schematic diagram illustrating an exemplary encoding process of a hybrid video coding system, consistent with embodiments of the disclosure.
Figure 2B:
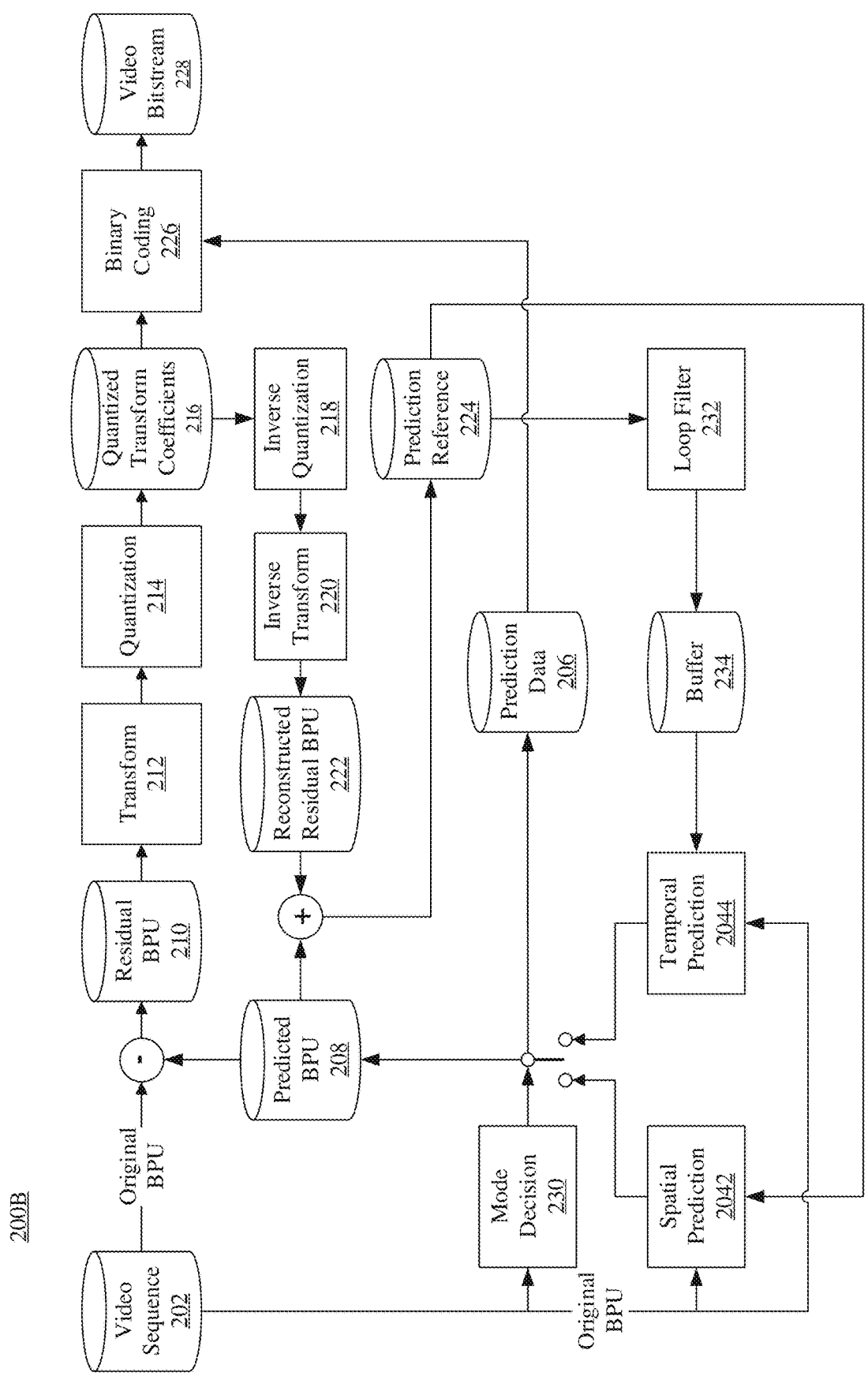
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
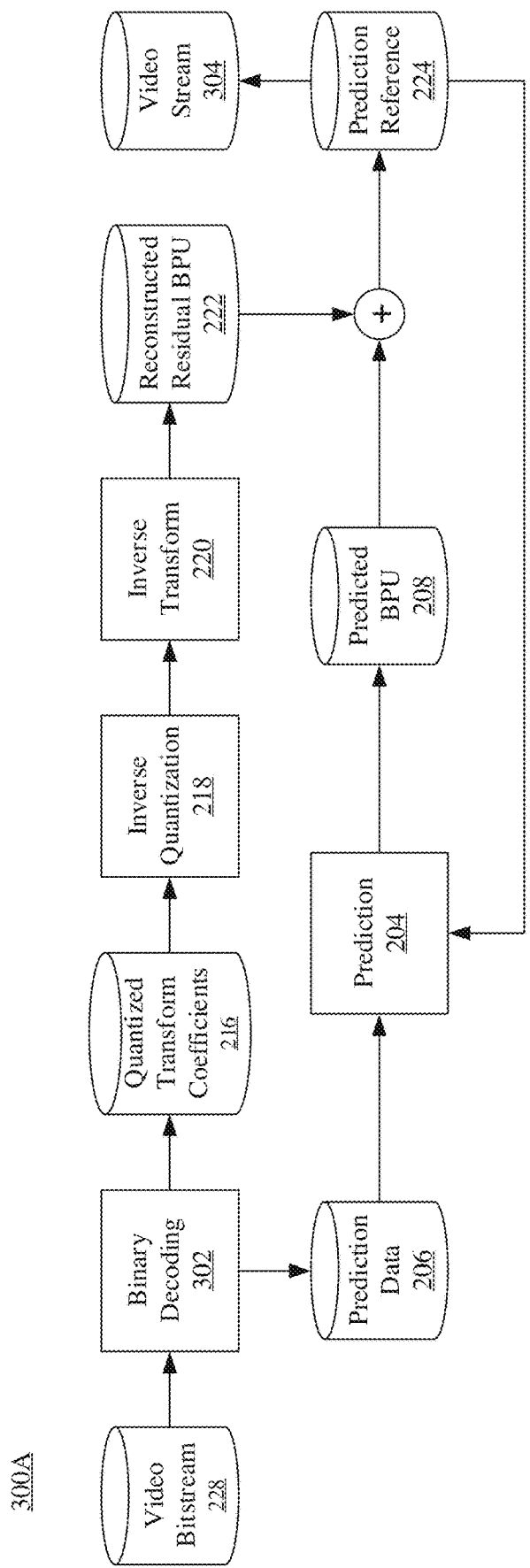
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
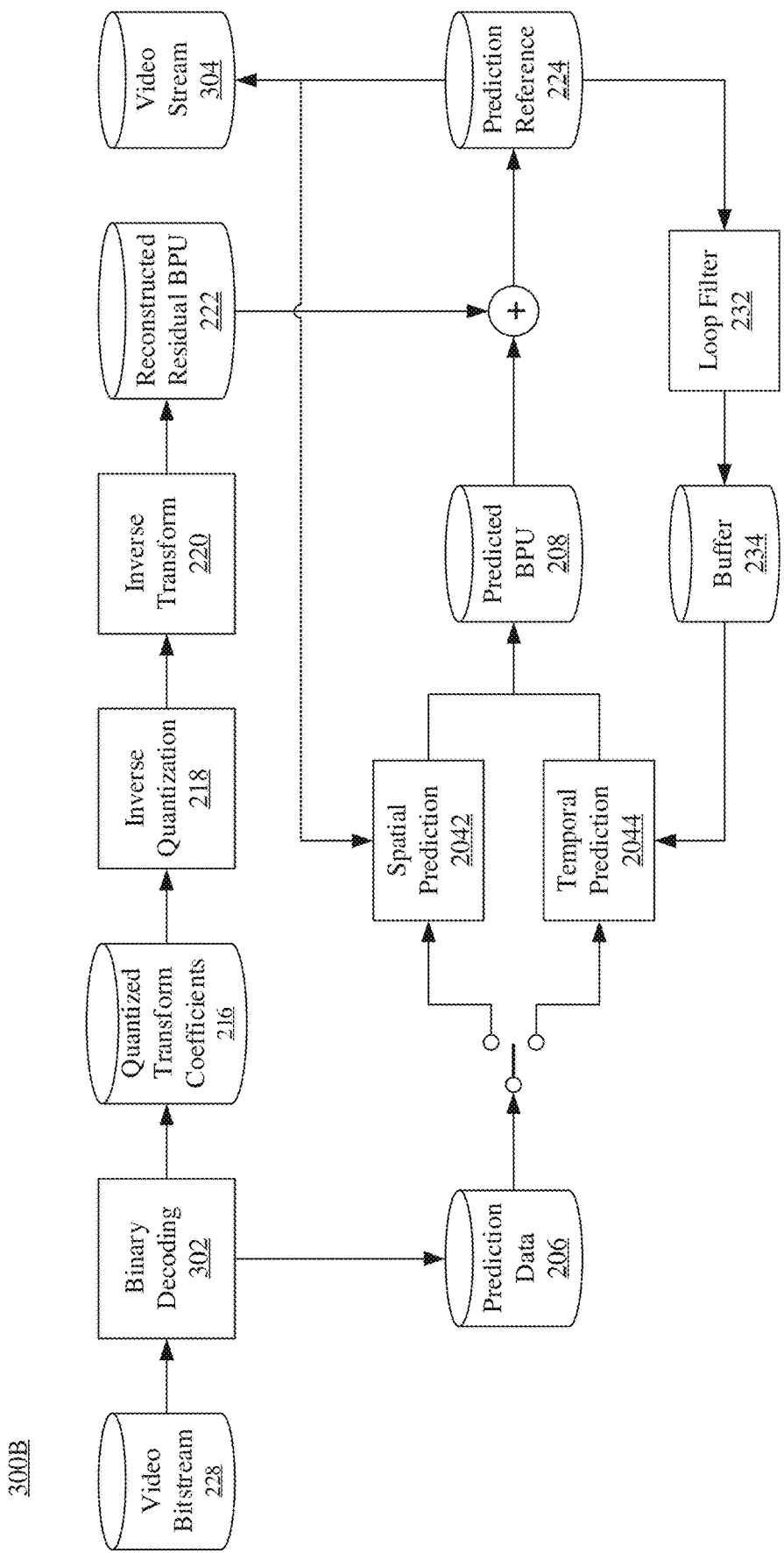
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
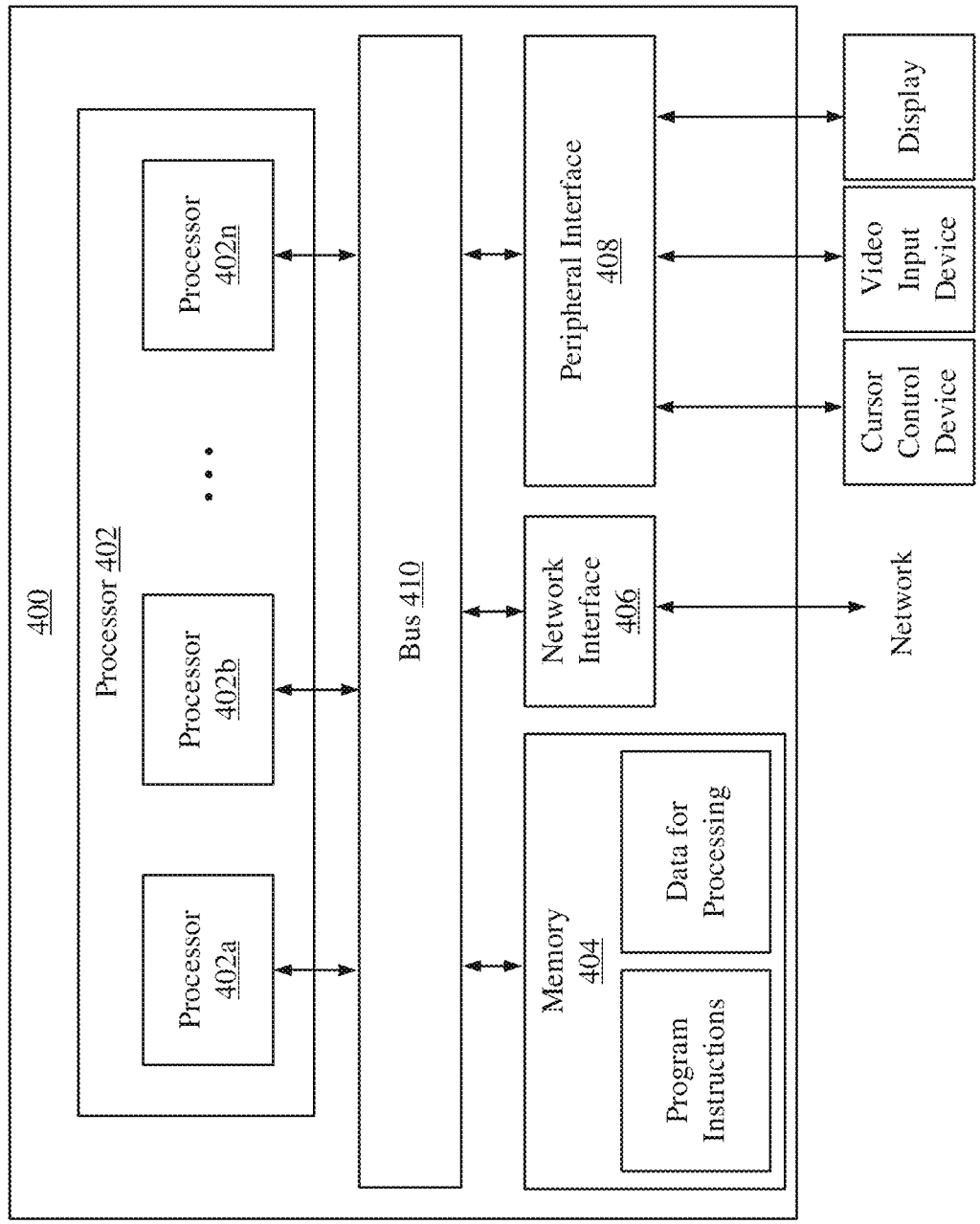
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In video coding scheme, the compression efficiency is jointly evaluated by the bitrate and the coding distortion between the original and the reconstructed video. Lower bitrate indicates that less bits are consumed to code the video, and hence higher compression efficiency is achieved. Lower distortion implies that less mismatch occurs between the reconstruction video and the original video, and hence higher image quality can be observed. Therefore, lower bitrate and less distortion are the objects of an efficient video coding framework.

However, for the same codec, compressed bitrate and coding distortion are two factors that need to be balanced. When more bits are consumed, more details can be reserved and hence lower distortion is achieved. Therefore, rate-distortion optimization (RDO) dedicated to achieving the optimal balance between the rate and the distortion plays a crucial role in video coding scheme.

In general, to evaluate the joint rate-distortion performance, the following rate-distortion (RD) cost function is used, $$J=R+\lambda \cdot D \quad (1),$$

where R, D, and J denote the rate, the distortion, and the joint cost, respectively. The factor $\lambda$ is the Lagrangian multiplier, which represents the weight between bitrate and distortion. Alternatively, in some embodiments, the rate-distortion cost function would be also expressed as: $J=D+\lambda \cdot R$, as factor $\lambda$ represents the weight between bitrate and distortion.

Specifically, the calculation of rate-distortion optimization cost may differ in different codecs and video coding modules. For example, during the mode decision process, full-RD cost is determined to make better RDO decision where the distortion D is calculated by Sum of Squared Difference (SSD), in the case where image quality evaluated by Peak Signal to Noise Ratio (PSNR) and the calculation of rate cost considers all the bits consumed. Nevertheless, in the motion estimation, simplified RD cost is usually used. For example, in the HEVC reference software HM and VVC reference software VTM, the distortion cost is determined by Sum of Absolute Difference (SAD) in the integer motion estimation stage and by Sum of Absolute Transformed Difference (SATD) in the fractional motion estimation stage, during which only the bits for coding motion vector are taken into consideration in the cost of rate.

In the RDO process, one of the key factors is how to design the value of Lagrangian multiplier $\lambda$. In the H.264.AVC and HEVC based codecs, two categories of methods can be used. The first category computes the theoretical RD cost function based on a given statistic model for video data. The second category uses an operational RD cost function, which is determined based on the data to be compressed, such as context based RDO or Laplace distribution based RDO. No matter which method is used, the factor $\lambda$ depends on the codec techniques and calculation method of RD cost.

Although PSNR reveals the objective distortion in terms of video signal, it may not correlate well with human visual system (HVS) and cannot measure the images' perceptual distortions well. Therefore, in some embodiments, a structure similarity index (SSIM) based quality assessment method can be used. SSIM includes three comparisons: luminance, contrast and structure. SSIM can be derived based on the following equation:

$$SSIM=L(x,y)\times C(x,y)\times S(x,y) \quad (2).$$

where terms L(x, y), C(x, y), and S(x, y) represent the luminance comparison, contrast comparison, and structure comparison, respectively, according to the following equations:

$$L(x, y) = \frac{2\mu_x \mu_y + C_1}{\mu_x^2 + \mu_y^2 + C_1} \quad (3)$$

$$C(x, y) = \frac{2\sigma_x \sigma_y + C_2}{\sigma_x^2 + \sigma_y^2 + C_2} \quad (4)$$

$$S(x, y) = \frac{\sigma_{xy} + C_3}{\sigma_x \sigma_y + C_3}. \quad (5)$$

In the above equations, the quantities x, y are two nonnegative image signals. $\mu_x$ and $\mu_y$ are the means of x and y, respectively. $\sigma_x$ and $\sigma_y$ are the standard deviations of x and y, respectively, and $\sigma_{xy}$ is the sample cross-covariance between x and y. $C_1$, $C_2$, and $C_3$ are used to stabilize the distortion measure to avoid the denominator being zero or too small. According to some embodiments, $C_1=(K_1\times L)^2$, $C_2=(K_2\times L)^2$ and $C_3=C_2/2$, where $K_1=0.01$, $K_2=0.03$, and $L=2^n-1$ (n is the bit depth), and SSIM can be determined based on the following equation:

$$SSIM = \frac{(2\mu_x \mu_y + C_1)(2\sigma_{xy} + C_2)}{(\mu_x^2 + \mu_y^2 + C_1)(\sigma_x^2 + \sigma_y^2 + C_2)}. \quad (6)$$

Based on SSIM, multi-scale-structural similarity index (MS-SSIM) can be used, which is defined by $$MS\text{-}SSIM(x,y)=(L_M(x,y)\alpha^M)\Pi_{j=1}^{M}C_j(x,y)^{\beta j}\times S_j(x,y)^{\gamma j} \quad (7).$$

In equation (7), M is the scale level. M=1 represents the original image size, M=2 represents half of the original image size, and so on. In some embodiments, M varies from 1 to 5, $\beta_1=\gamma_1=0.0448$, $\beta_2=\gamma_2=0.2856$, $\beta_3=\gamma_3=0.3001$, $\beta_4=\gamma_4=0.2363$, and $\alpha_5=\beta_5=\gamma_5=0.1333$.

Conventionally, the $\lambda$ models are established for the codec based on previous video coding standards, such as H.264/AVC and HEVC. However, no method or system has been developed to deploy the rate-distortion optimization (RDO) model on the VVC based codecs.

Although some RDO methods for the image quality assessed by PSNR are conventionally in use, it is desirable to develop new RDO formula to achieve higher compression performance when the assessment of SSIM or MS-SSIM is used.

The present disclosure provides embodiments to develop the RDO model for the VVC based codec and other video coding technologies when SSIM or MS-SSIM is used as the assessment method.

FIG. 5 shows a flow chart of a method for optimizing SSIM/MS-SSIM index in video coding, according to some embodiments of the present disclosure. Method 500 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 500. In some embodiments, method 500 can be implemented by a computer program product, embodied in a computer-readable medium, including computer-executable instructions, such as program code, executed by computers (e.g., apparatus 400 of FIG. 4). Referring to FIG. 5, method 500 may include the following steps 502-506.

In step 502, training data based on one or more video sequences is generated, wherein the training data includes a structure similarity (SSIM) index or a multi-scale-structural similarity (MS-SSIM) index. In step 504, a rate-distortion optimization (RDO) model is trained using the training data. In step 506, one or more video sequences are processed using the RDO model.

In some embodiments, when PSNR is evaluated, the distortion cost is determined using the SAD, SATD, or SSD because they can reflect Mean Square of Error (MSE) directly. For the assessment of SSIM/MS-SSIM, MSE does not fit the distortion cost well and hence the following distortion cost function is used:

$$D = n \cdot (1 - SSIM) \qquad (8),$$

where n is the number of image samples. Similarly, for MS-SSIM, the distortion cost can be determined by $$D = n \cdot (1 - MSSSIM) \qquad (9).$$

For the convenience of explanation, the following description will use the distortion cost function (8) as an example. However, it is contemplated that the described principles and methods also work with the distortion cost function (9).

Combing the rate cost, the overall RD cost function is expressed as $$J = R + \lambda \cdot n \cdot (1 - SSIM) \qquad (10).$$

According to the disclosed embodiments, the multiplier can be determined based on a slope between the variances of rate and the variances of distortion. Assuming the rate R and the distortion D are differentiable everywhere as shown in FIG. 6, the minimum of the RDO cost J is given by setting its derivative to zero, then $$\lambda = -\frac{\partial R}{\partial D}. \qquad (11)$$

In some embodiments, the rate and distortion depend on the exact codec techniques, the to-be-coded video content, and a quantization level that balances the ratio between bitrate and reconstruction distortion. Therefore, the function (11) can be expressed as $$\lambda = -\frac{\partial R}{\partial D} = -\frac{R(C, T, QP)}{D(C, T, QP)}, \qquad (12)$$

where C denotes the codec used, T denotes the texture of video content, and QP is the quantization parameter.

In some embodiments, the rate-distortion optimization model is developed based on the training of to-be-compressed data and the VVC based codec is used. But it is contemplated that the disclosed methods can also be applied to other codecs. With respect to the video content, it depends on the usage type of the video codec and the training dataset representing the videos in real circumstances may be used. For example, the UGC database released in the compression challenge of IEEE Conference on Computer Vision and Pattern Recognition (CVPR) 2020 may be used.

When the video codec and video content are determined, the rate-distortion optimization model can be determined using the quantization parameter (which can be determined by quantization stages 214 and 218). And the lambda derivation is modelled as $$\lambda = -\frac{\partial R(QP)}{\partial D(QP)} = -\frac{\frac{\partial R}{\partial QP}}{\frac{\partial D}{\partial QP}}. \qquad (13)$$

In some embodiments, the rate-distortion optimization model is trained using frame level data. In exploring the expressions of ∂R(QP) and ∂D(QP), the training videos in dataset are compressed in a wide QP range, e.g., 15 to 40. The coding bitrates and SSIM/MS-SSIM of each sequence are recorded and the average values at each QP are determined. According to some embodiments of the present disclosure, two exemplary methods may be used to determine the average bitrate and the average structure similarity index (e.g., the average SSIM or the average MS-SSIM).

FIG. 7 shows a flow chart of an example method for determining average bitrate and average structure similarity index, according to some imbibements of present disclosure. Method 700 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 700. In some embodiments, method 700 can be implemented by a computer program product, embodied in a computer-readable medium, including computer-executable instructions, such as program code, executed by computers (e.g., apparatus 400 of FIG. 4). Referring to FIG. 7, method 700 may include the following steps 702-704.

In step 702, an average bitrate is determined using a sum of the coding bitrates of the one or more video sequences and a number of the one or more video sequences. That is, the sum of the coding bitrates of the one or more video sequences is averaged by the number of the one or more video sequences. In step 704, an average structure similarity index is determined using a sum of the structure similarity indices over frames of the one or more video sequences and the number of the one or more video sequences. That is, the sum of the structure similarity indices over frames of the one or more video sequences is averaged by the number of the one or more video sequences. Therefore, the training data could include the average bitrate on frame level and the average structure similarity index (e.g., average SSIM or average MS-SSIM) on frame level.

Figure 8:
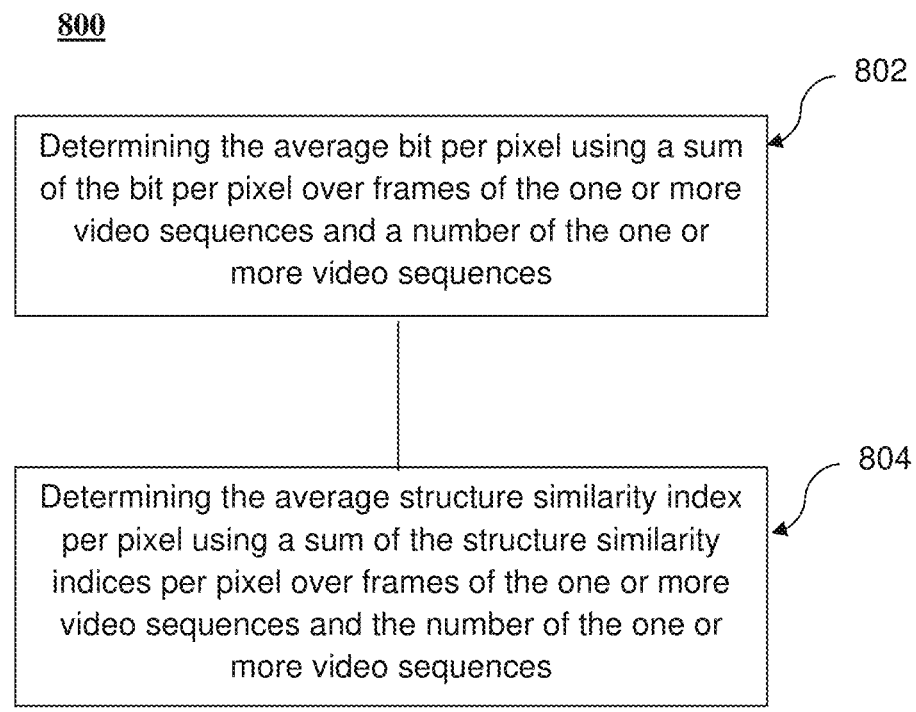
FIG. 8 shows a flow chart of another method determining the average bitrate and the average structure similarity index, according to some embodiments of the present disclosure.

FIG. 8 shows a flow chart of another example method for calculating average bitrate and average structure similarity index, according to some embodiments of the present disclosure. Method 800 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 800. In some embodiments, method 800 can be implemented by a computer program product, embodied in a computer-readable medium, including computer-executable instructions, such as program code, executed by computers (e.g., apparatus 400 of FIG. 4). Referring to FIG. 8, method 800 may include the following steps 802-804.

When the bitrate is determined per pixel, it can be represented by bit per pixel (bpp). In step 802, the average bit per pixel is determined using a sum of the bit per pixel over frames of the one or more video sequences and a number of the one or more video sequences. That is, the sum of the bit per pixel over frames of the one or more video sequences is averaged by the number of the one or more video sequences. In step 804, the average structure similarity index per pixel is determined using a sum of the structure similarity indices per pixel over frames of the one or more video sequences and the number of the one or more video sequences. That is, the sum of the structure similarity indices per pixel over frames of the one or more video sequences is averaged by the number of the one or more video sequences. Therefore, the training data could include the average bit per pixel on frame level and the average structure similarity index (e.g., average SSIM or average MS-SSIM) on frame level. The method 800 may offer better precision.

In some embodiments, the average bitrate and average SSIM per pixel at different QPs are determined. FIG. 9A and FIG. 9B illustrate exemplary relationships of R-QP and D-QP, respectively, according to some embodiments of the present disclosure. When the bitrate is computed per pixel, it can be represented by bit per pixel (bpp). As shown in FIG. 9A, the graph shows that there can be an exponential relationship between the average bpp and QP. This relationship can be modelled as:

$$\frac{R}{n} = bpp = p \cdot e^{-q \cdot QP}, \quad (14)$$

where p and q are the model parameters. In some embodiments, in order to obtain a curve-fitted, the values are 5.92 and 0.167, respectively. With respect to the relationship between the distortion and QP, as shown in FIG. 9B, it can be approximately expressed as:

$$\frac{D}{n} = 1 - SSIM = a \cdot e^{\frac{QP+b}{c}}, \quad (15)$$

where in some embodiments the parameters a, b, and c can be 0.00052, 0.238, and 12.05, respectively, for obtaining a curve-fitted. By incorporating (14) and (15) into (13), the multiplier λ can be determined as $$\lambda = -\frac{c \cdot q^2 \cdot e^{-q \cdot QP}}{a \cdot e^{(QP+b)/c}}. \quad (16)$$

In some embodiments, the rate-distortion optimization model is trained based on block level data. In the block-based hybrid video coding framework, RDO is conducted on the coding block level, such as the partitioning mode decision of the CTU (e.g., mode decision 230), the motion estimation for the prediction unit (PU) (e.g., prediction stage 204), etc. The methods are similar to method 700 and method 800, and the average bitrate and average structure similarity index over blocks are determined instead of over frames. If the rate-distortion optimization model is trained based on the encoding data summarized on the block level, more precise and higher R-D performance can be achieved.

The block unit can be selected as CTU, or CU, or other image region sizes, e.g., 32×32 pixels. In some embodiments, the CTU with a size of 128×128 pixels can be used. For each CTU, the consumed bits for the whole CTU and the SSIM of the CTU are recorded. Similar to the above-described rate-distortion optimization (RDO) model that is trained based on frame level data, the training data could include an average bitrate over blocks and an average SSIM/MS-SSIM over blocks. The average bitrate and average SSIM per pixel at different QPs can also be determined. When the bitrate is computed per pixel, it can be represented by bit per pixel (bpp). FIG. 10A and FIG. 10B illustrate exemplary relationships of R-QP and D-QP, respectively, according to some embodiments of the present disclosure. The curve-fitted R-QP model and D-QP model are also same as the equations (14) and (15), but the values of the parameters in the equations are different. For the CTU-level based R-QP model, in some embodiments, the values of p and q may be 6.28 and 0.167, respectively. For the CTU-level D-QP model, in some embodiments, the values of a, b, and c may be 0.00045, −0.04, and 11.54, respectively. Based on the CTU-level rate-distortion optimization model, in some embodiments the multiplier may be determined as follows:

$$\lambda = 24303 \times e^{-(0.25 \cdot QP + 0.02)} \quad (17).$$

When MS-SSIM is used as the assessment of the image quality, the rate-distortion model may be trained using block-level encoding data. Accordingly, the distortion may only be evaluated by SSIM, rather than MS-SSIM. The reason is that the calculation of MS-SSIM may not work well with small image sizes. To address the above issue, in some embodiments, when MS-SSIM is preferred over SSIM (e.g., in scenarios for determining the subjective quality of HVS), a method for block-level MS-SSIM computation can be combined into the rate-distortion optimization model that is trained based on block level data.

Figure 11:
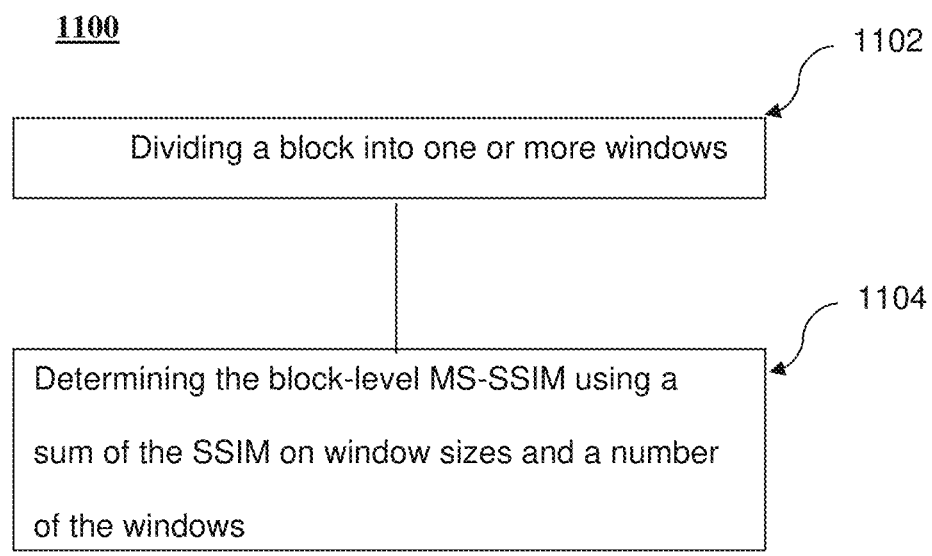
FIG. 11 shows a flow chart of an example method for block-level MS-SSIM computation, according to some embodiments of the present disclosure.

FIG. 11 shows a flow chart of an example method for block-level MS-SSIM computation, according to some embodiments of the present disclosure. Method 1100 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1100. In some embodiments, method 800 can be implemented by a computer program product, embodied in a computer-readable medium, including computer-executable instructions, such as program code, executed by computers (e.g., apparatus 400 of FIG. 4). Referring to FIG. 11, method 1100 may include the following steps 1102-1104.

In step 1102, a block is divided into one or more windows. Specifically, a window size is no larger than the block size, and there is SSIM on window size for each window. In step 1104, the block-level MS-SSIM is determined using a sum of the SSIM on window sizes and a number of windows. Therefore, the block-level MS-SSIM is obtained according to $$\text{Block } MS\text{-}SSIM = \frac{1}{M}\sum_{i=1}^{M} SSIM_i, \tag{18}$$

where M is the count number specifying the number of windows. Assuming the block size is w×h, the window size can be set to $(w/2^{i-1}) \times (h/2^{i-1})$ for M=i. The value of M is not fixed and can be adaptively adjusted by the block size. In some embodiments, the window size of the largest M may not be made smaller than 8×8 pixels.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

The embodiments may further be described using the following clauses:

1. A video data processing method, comprising:
generating training data based on one or more video sequences, the training data including a structure similarity index comprising at least one of structure similarity index (SSIM) or multi-scale-structural similarity index (MS-SSIM);
training a rate-distortion optimization (RDO) model using the training data;
processing the one or more video sequences using the rate-distortion optimization model.

2. The method of clause 1, wherein the training data comprise a rate-distortion cost function dependent on the SSIM.

3. The method of clause 1, wherein the training data comprises a rate-distortion cost function dependent on the MS-SSIM.

4. The method of any one of clauses 1 to 3, wherein the rate-distortion optimization model is based on frame level data.

5. The method of clause 4, wherein the training data comprises an average bitrate and an average structure similarity index, the method further comprising:
determining the average bitrate using a sum of the coding bitrates of the one or more video sequences and a number of the one or more video sequences;
determining the average structure similarity index using a sum of the structure similarity indices over frames of the one or more video sequences and the number of the one or more video sequences.

6. The method of clause 4, wherein the training data comprise an average bit per pixel, and an average structure similarity index per pixel, the method further comprising:
determining the average bit per pixel using a sum of the bit per pixel over frames of the one or more video sequences and a number of the one or more video sequences;
determining the average structure similarity index per pixel over frames of the one or more video sequences using a sum of the structure similarity indices per pixel and the number of the one or more video sequences.

7. The method of any one of clauses 1 to 3, wherein the rate-distortion optimization model is based on block level data.

8. The method of clause 7, wherein the training data comprise an average bitrate and an average structure similarity index, the method further comprising:
determining the average bitrate using a sum of coding bitrates and a number of the one or more video sequences;
determining the average structure similarity index using a sum of the structure similarity indices over blocks of the one or more video sequences and the number of the one or more video sequence.

9. The method of clause 7, wherein the training data comprise an average bit per pixel, and an average structure similarity index per pixel, the method further comprising:
determining the average bit per pixel using a sum of the bit per pixel over blocks of the one or more video sequences and a number of the one or more video sequences;
determining the average structure similarity index per pixel using a sum of the structure similarity indices per pixel over blocks of the one or more video sequences and the number of the one or more video sequences.

10. The method of any one of clauses 7 to 9, wherein the training data comprise the SSIM and the MS-SSIM, and the rate-distortion optimization model comprises a method for block-level MS-SSIM computation, the method for block-level MS-SSIM computation comprising:
dividing a block into one or more windows;
determining the block-level MS-SSIM using a sum of SSIM on window sizes and a number of the windows.

11. The method of clause 10, wherein the window size is set to $(w/2^{i-1}) \times (h/2^{i-1})$ for M=i, where w is a width of the block size, h is a height of the block size, i is an integer and M is the number of windows.

12. The method of clause 11, wherein the window size is not smaller than 8×8 pixels.

13. An apparatus for performing video data processing, the apparatus comprising:
a memory configured to store instructions; and
one or more processors communicatively coupled to the memory and configured to execute the instructions to cause the apparatus to perform:
generating training data based on one or more video sequences, the training data including a structure similarity index comprising at least one of structure similarity index (SSIM) or multi-scale-structural similarity index (MS-SSIM);
training a rate-distortion optimization (RDO) model using the training data;
processing the one or more video sequences using the rate-distortion optimization model.

14. The apparatus of clause 13, wherein the training data comprise a rate-distortion cost function dependent on the SSIM.

15. The apparatus of clause 13, wherein the training data comprises a rate-distortion cost function dependent on the MS-SSIM.

16. The apparatus of any one of clauses 13 to 15, wherein the rate-distortion optimization model is based on frame level data.

17. The apparatus of clause 16, wherein the training data comprises an average bitrate and an average structure similarity index, and the processor is further configured to execute the instructions to cause the apparatus to perform:
determining the average bitrate using a sum of the coding bitrates of the one or more video sequences and a number of the one or more video sequences;
determining the average structure similarity index using a sum of the structure similarity indices over frames of the one or more video sequences and the number of the one or more video sequences.

18. The apparatus of clause 16, wherein the training data comprise an average bit per pixel, and an average structure similarity index per pixel, and the processor is further configured to execute the instructions to cause the apparatus to perform:
determining the average bit per pixel using a sum of the bit per pixel over frames of the one or more video sequences and a number of the one or more video sequences;
determining the average structure similarity index per pixel over frames of the one or more video sequences using a sum of the structure similarity indices per pixel and the number of the one or more video sequences.

19. The apparatus of any one of clauses 13 to 15, wherein the rate-distortion optimization model is based on block level data.

20. The apparatus of clause 19, wherein the training data comprise an average bitrate and an average structure similarity index, and the processor is further configured to execute the instructions to cause the apparatus to perform:
determining the average bitrate using a sum of coding bitrates and a number of the one or more video sequences;
determining the average structure similarity index using a sum of the structure similarity indices over blocks of the one or more video sequences and the number of the one or more video sequence.

21. The apparatus of clause 19, wherein the training data comprise an average bit per pixel, and an average structure similarity index per pixel, and the processor is further configured to execute the instructions to cause the apparatus to perform:
determining the average bit per pixel using a sum of the bit per pixel over blocks of the one or more video sequences and a number of the one or more video sequences;
determining the average structure similarity index per pixel using a sum of the structure similarity indices per pixel over blocks of the one or more video sequences and the number of the one or more video sequences.

22. The apparatus of any one of clauses 19 to 21, wherein the training data comprise the SSIM and the MS-SSIM, the rate-distortion optimization model comprises a method for block-level MS-SSIM computation, and the processor is further configured to execute the instructions to cause the apparatus to perform:
dividing a block into one or more windows;
determining the block-level MS-SSIM using a sum of SSIM on window sizes and a number of the windows.

23. The apparatus of clause 22, wherein the window size is set to $(w/2^{i-1}) \times (h/2^{i-1})$ for M=i, where w is a width of the block size, h is a height of the block size, i is an integer and M is the number of windows.

24. The apparatus of clause 23, wherein the window size is not smaller than 8×8 pixels.

25. A non-transitory computer readable medium that stores a set of instructions that is executable by one or more processors of an apparatus to cause the apparatus to initiate a method for performing video data processing, the method comprising:
generating training data based on one or more video sequences, the training data including a structure similarity index comprising at least one of structure similarity index (SSIM) or multi-scale-structural similarity index (MS-SSIM);
training a rate-distortion optimization (RDO) model using the training data;
processing the one or more video sequences using the rate-distortion optimization model.

26. The non-transitory computer readable medium of clause 25, wherein the training data comprise a rate-distortion cost function dependent on the SSIM.

27. The non-transitory computer readable medium of clause 25, wherein the training data comprises a rate-distortion cost function dependent on the MS-SSIM.

28. The non-transitory computer readable medium of any one of clauses 25 to 27, wherein the rate-distortion optimization model is based on frame level data.

29. The non-transitory computer readable medium of clause 28, wherein the training data comprises an average bitrate and an average structure similarity index, the method further comprising:

determining the average bitrate using a sum of the coding bitrates of the one or more video sequences and a number of the one or more video sequences;

determining the average structure similarity index using a sum of the structure similarity indices over frames of the one or more video sequences and the number of the one or more video sequences.

30. The non-transitory computer readable medium of clause 28, wherein the training data comprise an average bit per pixel, and an average structure similarity index per pixel, the method further comprising:

determining the average bit per pixel using a sum of the bit per pixel over frames of the one or more video sequences and a number of the one or more video sequences;

determining the average structure similarity index per pixel over frames of the one or more video sequences using a sum of the structure similarity indices per pixel and the number of the one or more video sequences.

31. The non-transitory computer readable medium of any one of clauses 25 to 27, wherein the rate-distortion optimization model is based on block level data.

32. The non-transitory computer readable medium of clause 31, wherein the training data comprise an average bitrate and an average structure similarity index, the method further comprising:

determining the average bitrate using a sum of coding bitrates and a number of the one or more video sequences;

determining the average structure similarity index using a sum of the structure similarity indices over blocks of the one or more video sequences and the number of the one or more video sequence.

33. The non-transitory computer readable medium of clause 31, wherein the training data comprise an average bit per pixel, and an average structure similarity index per pixel, the method further comprising:

determining the average bit per pixel using a sum of the bit per pixel over blocks of the one or more video sequences and a number of the one or more video sequences;

determining the average structure similarity index per pixel using a sum of the structure similarity indices per pixel over blocks of the one or more video sequences and the number of the one or more video sequences.

34. The non-transitory computer readable medium of any one of clauses 31 to 33, wherein the training data comprise the SSIM and the MS-SSIM, and the rate-distortion optimization model comprises a method for block-level MS-SSIM computation, the method for block-level MS-SSIM computation comprising:

dividing a block into one or more windows;

determining the block-level MS-SSIM using a sum of SSIM on window sizes and a number of the windows.

35. The non-transitory computer readable medium of clause 34, wherein the window size is set to $(w/2^{i-1}) \times (h/2^{i-1})$ for M=i, where w is a width of the block size, h is a height of the block size, i is an integer and M is the number of windows.

36. The non-transitory computer readable medium of clause 35, wherein the window size is not smaller than 8×8 pixels.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video data processing method, comprising:

generating training data based on one or more video sequences, the training data including a rate-distortion cost function dependent on a similarity index comprising at least one of structure similarity index (SSIM) or multi-scale structural similarity index (MS-SSIM);

training a rate-distortion optimization (RDO) model using the training data;

processing the one or more video sequences using the rate-distortion optimization model.

2. The method of claim 1, wherein the rate-distortion optimization model is based on frame level data.

3. The method of claim 2, wherein the training data comprises an average bitrate and an average structure similarity index, the method further comprising:

determining the average bitrate using a sum of the coding bitrates of the one or more video sequences and a number of the one or more video sequences;

determining the average structure similarity index using a sum of the structure similarity indices over frames of the one or more video sequences and the number of the one or more video sequences.

4. The method of claim 2, wherein the training data comprise an average bit per pixel, and an average structure similarity index per pixel, the method further comprising:

determining the average bit per pixel using a sum of the bit per pixel over frames of the one or more video sequences and a number of the one or more video sequences;

determining the average structure similarity index per pixel over frames of the one or more video sequences using a sum of the structure similarity indices per pixel and the number of the one or more video sequences.

5. The method of claim 1, wherein the rate-distortion optimization model is based on block level data.

6. The method of claim 5, wherein the training data comprise an average bitrate and an average structure similarity index, the method further comprising:

determining the average bitrate using a sum of coding bitrates and a number of the one or more video sequences;

determining the average structure similarity index using a sum of the structure similarity indices over blocks of the one or more video sequences and the number of the one or more video sequence.

7. The method of claim 5, wherein the training data comprise an average bit per pixel, and an average structure similarity index per pixel, the method further comprising:

determining the average bit per pixel using a sum of the bit per pixel over blocks of the one or more video sequences and a number of the one or more video sequences;

determining the average structure similarity index per pixel using a sum of the structure similarity indices per pixel over blocks of the one or more video sequences and the number of the one or more video sequences.

8. The method of claim 5, wherein the training data comprise the SSIM and the MS-SSIM, and the rate-distortion optimization model comprises a method for block-level MS-S SIM computation, the method for block-level MS-SSIM computation comprising:

dividing a block into one or more windows;

determining the block-level MS-SSIM using a sum of SSIM on window sizes and a number of the windows.

9. The method of claim 8, wherein the window size is set to $(w/2^{i-1}) \times (h/2^{i-1})$ for M=i, where w is a width of the block size, h is a height of the block size, i is an integer and M is the number of windows.

10. The method of claim 9, wherein the window size is not smaller than 8×8 pixels.

11. An apparatus for performing video data processing, the apparatus comprising:

a memory configured to store instructions; and one or more processors communicatively coupled to the memory and configured to execute the instructions to cause the apparatus to perform:

generating training data based on one or more video sequences, the training data including a rate-distortion cost function dependent on a similarity index comprising at least one of structure similarity index (SSIM) or multi-scale structural similarity index (MS-SSIM);

training a rate-distortion optimization (RDO) model using the training data;

processing the one or more video sequences using the rate-distortion optimization model.

12. The apparatus of claim 11, wherein the rate-distortion optimization model is based on frame level data.

13. The apparatus of claim 12, wherein the training data comprises an average bitrate and an average structure similarity index, and the processor is further configured to execute the instructions to cause the apparatus to perform:

determining the average bitrate using a sum of the coding bitrates of the one or more video sequences and a number of the one or more video sequences;

determining the average structure similarity index using a sum of the structure similarity indices over frames of the one or more video sequences and the number of the one or more video sequences.

14. The apparatus of claim 12, wherein the training data comprise an average bit per pixel, and an average structure similarity index per pixel, and the processor is further configured to execute the instructions to cause the apparatus to perform:

determining the average bit per pixel using a sum of the bit per pixel over frames of the one or more video sequences and a number of the one or more video sequences;

determining the average structure similarity index per pixel over frames of the one or more video sequences using a sum of the structure similarity indices per pixel and the number of the one or more video sequences.

15. The apparatus of claim 11, wherein the rate-distortion optimization model is based on block level data.

16. The apparatus of claim 15, wherein the training data comprise an average bitrate and an average structure similarity index, and the processor is further configured to execute the instructions to cause the apparatus to perform:

determining the average bitrate using a sum of coding bitrates and a number of the one or more video sequences;

determining the average structure similarity index using a sum of the structure similarity indices over blocks of the one or more video sequences and the number of the one or more video sequence.

17. The apparatus of claim 15, wherein the training data comprise an average bit per pixel, and an average structure similarity index per pixel, and the processor is further configured to execute the instructions to cause the apparatus to perform:

determining the average bit per pixel using a sum of the bit per pixel over blocks of the one or more video sequences and a number of the one or more video sequences;

determining the average structure similarity index per pixel using a sum of the structure similarity indices per pixel over blocks of the one or more video sequences and the number of the one or more video sequences.

18. The apparatus of claim 15, wherein the training data comprise the SSIM and the MS-SSIM, the rate-distortion optimization model comprises a method for block-level MS-SSIM computation, and the processor is further configured to execute the instructions to cause the apparatus to perform:

dividing a block into one or more windows;

determining the block-level MS-SSIM using a sum of SSIM on window sizes and a number of the windows.

19. A non-transitory computer readable medium that stores a set of instructions that is executable by one or more processors of an apparatus to cause the apparatus to initiate a method for performing video data processing, the method comprising:

generating training data based on one or more video sequences, the training data including a rate-distortion cost function dependent on a similarity index comprising at least one of structure similarity index (SSIM) or multi-scale structural similarity index (MS-SSIM);

training a rate-distortion optimization (RDO) model using the training data;

processing the one or more video sequences using the rate-distortion optimization model.

20. The non-transitory computer readable medium of claim 19, wherein the rate-distortion optimization model is based on frame level data.

21. The non-transitory computer readable medium of claim 19, wherein the rate-distortion optimization model is based on block level data.

* * * * *